May 4, 1937. A. R. FERGUSON 2,078,939
VEHICLE TANK CONSTRUCTION
Filed July 6, 1934  3 Sheets-Sheet 1
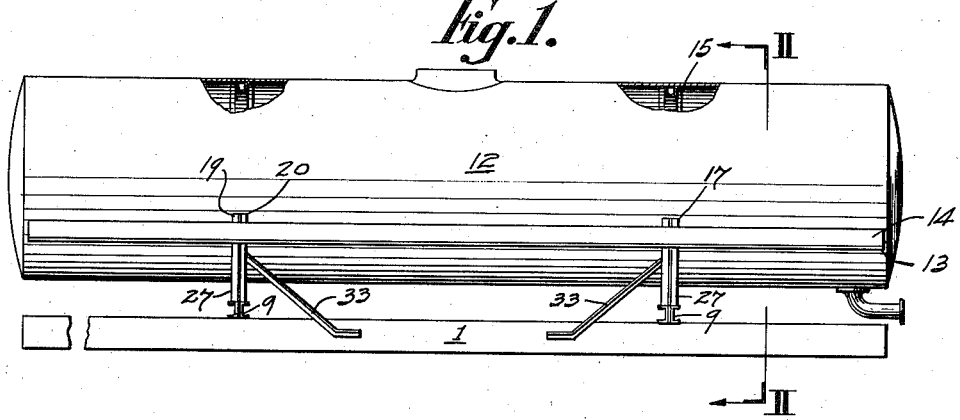
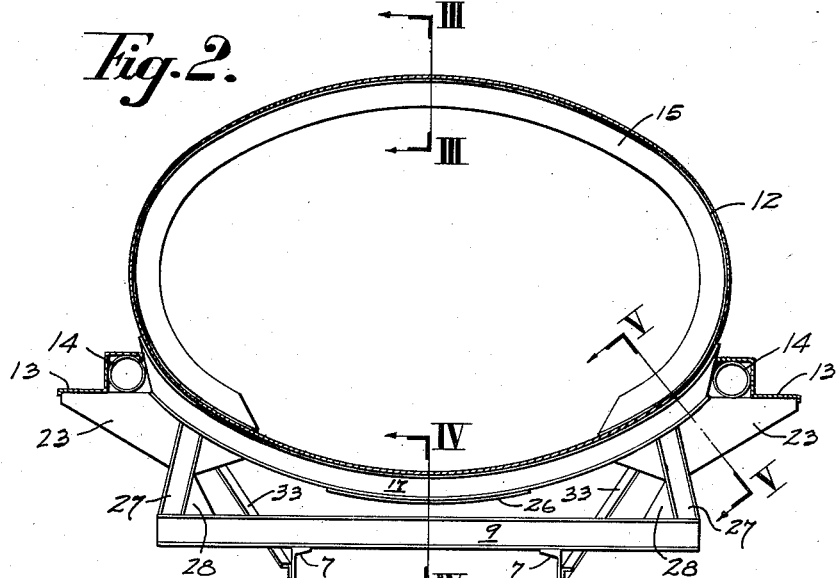
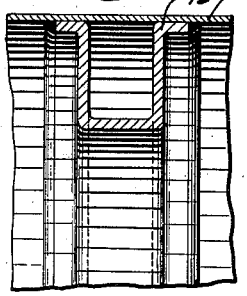
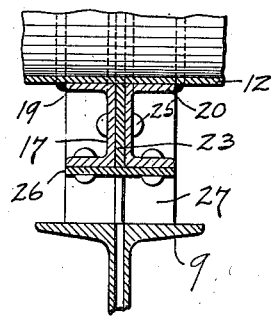
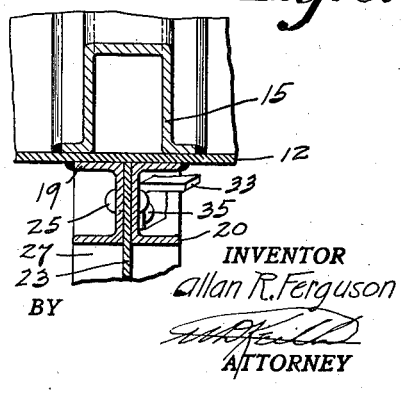
INVENTOR
Allan R. Ferguson
BY
ATTORNEY May 4, 1937.  A. R. FERGUSON  2,078,939
VEHICLE TANK CONSTRUCTION
Filed July 6, 1934   3 Sheets-Sheet 2
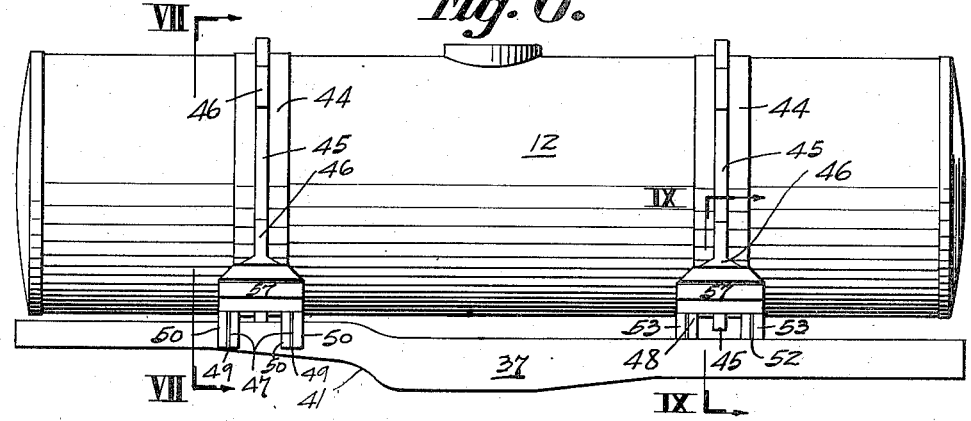
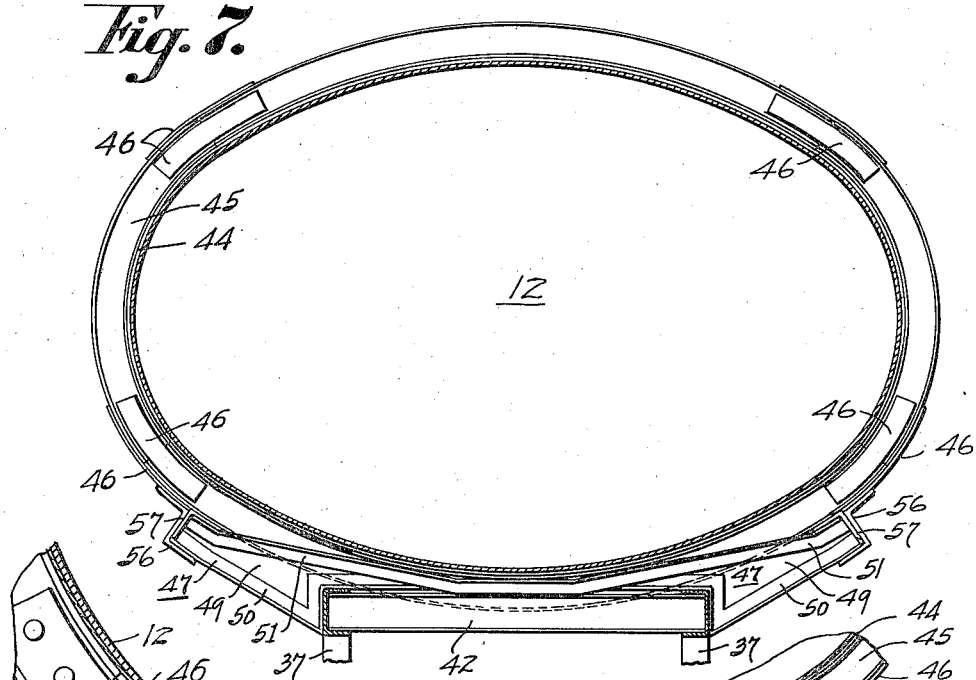
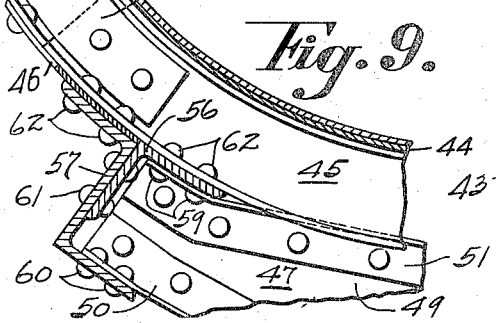
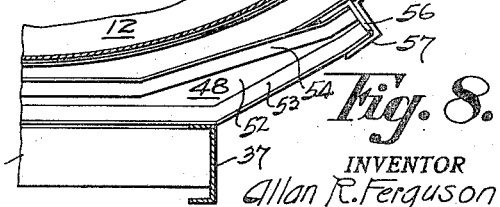
INVENTOR
Allan R. Ferguson
BY
ATTORNEY Patented May 4, 1937

2,078,939

UNITED STATES PATENT OFFICE 2,078,939

VEHICLE TANK CONSTRUCTION

Allan R. Ferguson, New Kensington, Pa., assignor to Aluminum Company of America, Pittsburgh, Pa., a corporation of Pennsylvania Application July 6, 1934, Serial No. 733,998

16 Claims. (Cl. 280—5)

This invention relates to vehicle tank structures. It relates especially to the type of automotive tank trucks and trailers commonly employed in transporting liquids, such as milk, gasoline and the like.

The general practice in mounting tanks on trucks and trailers of this type has been to rigidly support the tank upon a body bolster or similar member which is rigidly mounted upon the truck chassis and which encircles the lower portion of the tank. Such a structure is unsatisfactory, however, chiefly because it makes the tank rigid and substantially integral with the chassis, and does not permit the tank to adjust itself with respect to the varying concentrated stresses which are set up when the liquid in the tank changes position as the vehicle moves along the road, or when liquid is withdrawn or added.

It has now been found that when the tank is designed and supported in a manner which permits longitudinal and lateral deformation within suitable limits, the unduly concentrated stresses and strains to which the tank is normally subjected under ordinary conditions of operation are substantially eliminated.

It is therefore an object of this invention to provide an improved design for vehicle tanks and supports therefor. A second object is to provide a simple vehicle tank support which will permit the tank to automatically adjust itself in accordance with the forces acting thereon. A further object is to provide a support which is highly resistant to the shocks and vibrations to which the tank is subjected during ordinary use.

Further objects and advantages will appear from the following description when considered with the accompanying drawings, in which:

Fig. 1 is a side elevation, with parts broken away, of a portion of a vehicle tank structure embodying one form of the invention;

Fig. 2 is a section on the line II—II of Fig. 1 but on a larger scale than Fig. 1;

Figure 10:
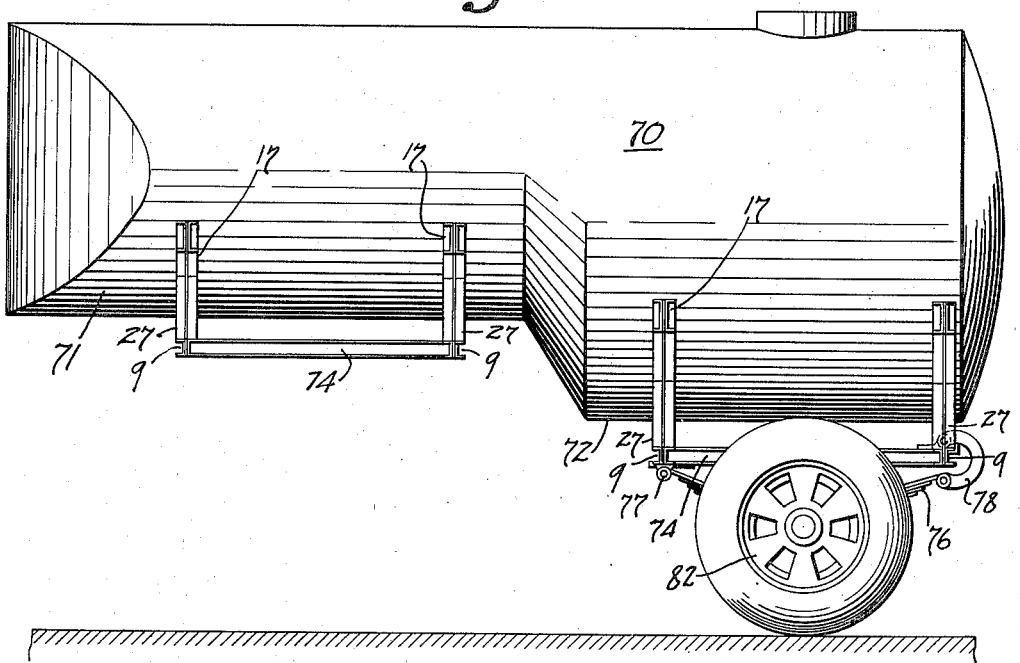

Figs. 3, 4, and 5 are views taken on the lines III—III, IV—IV, and V—V of Fig. 2 respectively, but on a larger scale than Fig. 2;

Fig. 6 is a side elevation showing a modified form of my invention;

Fig. 7 is a section taken on line VII—VII of Fig. 6 but drawn on a larger scale;

Fig. 8 is a view of another portion of the structure shown in Fig. 6, but on a larger scale;

Fig. 9 is a sectional view taken on the line IX—IX of Fig. 6, showing a portion of the modified structure on a larger scale;

Fig. 10 is a side elevation of another modified form of my invention; and

Figure 11:
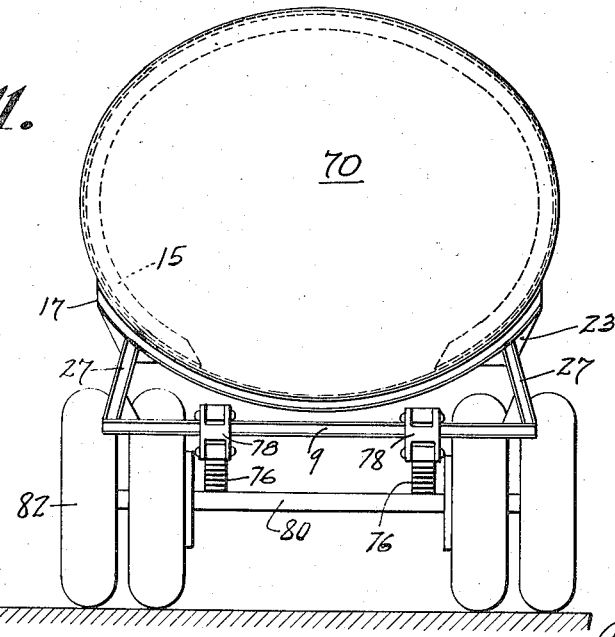

Fig. 11 is an end elevation of the modified form shown in Fig. 10.

Referring to the drawings, and particularly to Figs. 1 to 5, the numerals 1 and 3 designate the longitudinal side sills of the chassis or frame of a vehicle tank structure, such as a truck or trailer. These sills are preferably in the form of channels with inwardly-extending lower flanges 5 and upper flanges 7. Mounted upon the sills 1 and 3, and rigidly connected thereto by rivets or other suitable means, are the cross members 9, which are preferably in the form of channels disposed in pairs "back to back". Other structural shapes may obviously be employed in both longitudinal and transverse frame members, if preferred.

Supported on the cross members 9 is a tank 12, of the type customarily used in transporting gasoline and other liquids. The tank 12 may be constructed in any well known manner but is preferably built up from plates by riveting or welding. The tank is preferably provided with a walk way 13 and a hose carrier 14 extending along one or both sides, as shown.

Around at least a major portion of the interior of the tank 12 there are provided internal reinforcing members or ribs 15 which extend entirely around the top and sides of the tank interior and which are preferably discontinued at the bottom as shown, to facilitate draining. The reinforcing ribs 15 are preferably formed of structural sections such as channels having the edges of their flanges turned outwardly as shown and secured to the tank in any suitable manner such as, for example, by welding.

On the external surface of the tank 12, and preferably on only the lower portions thereof, external reinforcing members 17 are provided. These external reinforcing members consist of structural elements such as channel members 19 and 20 which are preferably welded to the tank back-to-back but spaced apart slightly and aligned with the inner reinforcing members 15. Each outer reinforcing member 17 is curved to conform closely with the curvature of at least the lower part of the external surface of the tank 12, to which it is firmly secured, and the ends of these reinforcing members preferably extend up the sides of the tank sufficiently to overlap portions of the tank supported internally by the internal reinforcing members 15. If the external reinforcing members 17 are limited to the lower part of the tank surface as shown, the exterior of the tank is left smooth at the top and sides and its appearance is improved.

Gusset plates 23 are preferably inserted at each side of the tank in the space left between the parallel, outwardly-extending flanges of the elements 19 and 20 constituting the external reinforcing members 17, and are secured in position by rivets 25 or in other suitable manner. The gusset plates 23 facilitate the mounting of the tank on the vehicle frame or chassis, as will be described in more detail hereinbelow, and may also be extended outwardly to provide support for the walk ways 13 and the hose carriers 14. If desirable, the lower portion of the tank may be further reinforced by plates 26 (shown in Figs. 2 and 4) which are suitably secured to the external reinforcing members 17.

The tank 12 is mounted on and secured to the vehicle frame or chassis by supporting members or struts 27, preferably four in number. These supporting members are preferably in the form of channels or other structural elements slightly spaced apart and having parallel flanges or webs. In the preferred arrangement, a pair of these supporting members 27 connects each of two external reinforcing members 17 with a suitable portion of the frame, such as a transverse frame member 9 parallel and aligned with the reinforcing member. The lower ends of the supporting members are then secured adjacent the ends of the transverse members 9, preferably by means of gusset plates 28 inserted between the parallel faces of the structural elements constituting each member and riveted or otherwise firmly held in place. The upper ends of the supporting members 27 are secured to the external reinforcing members 17, preferably by riveting to the gusset plates 23. The supporting members preferably extend upwardly and inwardly and are preferably connected to portions of the outer reinforcing members 17 which overlie portions of the inner reinforcing members 15. They provide substantially point supports for the tank, keeping it out of contact with the frame.

Longitudinal rigidity for the supporting members is improved by providing braces such as angle members 33, which are secured at one end to the side sills 1 and 3 and at the other end to the reinforcing members 17 in any suitable fashion, as by rivets 35. The frame is, of course, mounted on running gear comprising wheels, axles, springs, etc., in known manner.

In the modified form of the invention shown in Figs. 6 to 9, the tank 12 is shown as being carried by the channeled side members 37 of a trailer chassis. It will be understood, however, that this form of the invention is not to be limited to use in a trailer, but that it may, as is the case with the embodiment previously described, be used with equal effectiveness in either tank trucks or trailers. In the vehicle shown, the side members 37 extend the length of the tank 12 and are angled upward, as indicated at 41, to permit connection to a truck tractor (not shown) adapted to work beneath the narrower forward portions of the frame. The side or longitudinal frame members 37 are connected, preferably near the front and rear ends and intermediately thereof, by channeled cross beams 42, 43, or the like, which are positioned and secured in known manner.

In this embodiment of the invention, the tank 12 is preferably provided with longitudinally spaced reinforcing straps or bands 44 which encircle the tank shell and which are welded or otherwise secured thereto. Attached to the straps 44 or directly to the tank body in some suitable fashion, as by rivets, are external reinforcing rings 45 which are preferably formed of structural shapes, such as channel sections arranged back-to-back. The reinforcing rings or members 45 are usually made up in two or more sections for convenience, with the ends of the parallel sections staggered or aligned, and the ends of adjoining sections are preferably connected or reinforced by plates 46 extending across the joint.

A pair of transverse members 47 is carried by the front portion of the side rails or longitudinal members 37, while a similar pair of transverse members 48 is attached to the rear portion of the side rails. These pairs of transverse members 47 and 48 extend across the longitudinal members and preferably outwardly and upwardly therefrom, and a reinforcing ring or member 45 is positioned between each of the pairs of transverse members. The longitudinal frame members 37 are preferably connected by cross beams 42, 43 extending under or adjacent each transverse member 47, 48. The difference in shape between members 47 and 48 is called for by the differences in shape and elevation of the parts of the longitudinal members 37 to which they are attached, and when the longitudinal members are straight and uniform, or when a difference in the elevation of the ends of the tank is immaterial, the transverse members may all be of the same shape.

The transverse members 47 are employed at the forward, upwardly-angled portion of the chassis. Each member 47 consists of a plate 49 standing vertically, with its lower edge recessed to fit across the longitudinal frame members 37 and reinforced, as by an angle-iron strip 50 secured along each side thereof. The upper edge of the plate 49 is shaped to make it narrow in the center with the corners extending upwardly and outwardly, and is reinforced, as by a pair of angle members 51 secured thereto. This construction is shown best in Fig. 7. The transverse members 48 are similar in construction, as shown in Fig. 8, and each consists of a plate 52 with reinforcing angles 53, 54, secured to its lower and upper edges, respectively. These members 48 can be deeper in the center, however, and can therefore rest completely on top of the longitudinal members 37, making it unnecessary to recess their lower edges. This may be done if desired in order to obtain greater rigidity of attachment to the longitudinal members, however. It is obvious that the transverse members 47 and 48 can be otherwise fabricated, as by casting, if desired.

As shown in Figs. 6, 7, and 8, and on a larger scale in Fig. 9, the transverse frame members 47 and 48 are connected to the reinforcing members 45 on the tank 12 by supporting members, preferably four in number. In the preferred arrangement, as shown best in Fig. 9, each supporting member consists of an angle member 56 and a Z-bar section 57 extending longitudinally of the tank. The angle member has one leg extending across the tops of a pair of transverse members 47 or 48 and secured to the upper edge reinforcing angles 51 or 54, as by rivets 59. The other leg of the angle member 56 extends downwardly across the upper part of the opening between the ends of the pair of transverse members. The Z-bar 57 has its lower flange extending beneath the lower edge reinforcing angles 50 or 53 of the pair of transverse members 47 or 48 and secured thereto as by rivets 60 or their equivalent. The central portion or web of the Z-bar extends upwardly across the opening between the ends of the transverse members and preferably in contact with the downwardly-extending leg of the angle member 56, to which it is secured, as by rivets 61. The upper flange of the Z-bar extends outwardly from the ends of the transverse members adjacent to the upper leg of angle member 56.

Each of two reinforcing members 45 on the tank 12 rests on a supporting member composed of the elements 56 and 57 extending between a pair of transverse members 47 or 48, and is supported thereby on both sides of the tank. This constitutes substantially a four-point support for the tank. The reinforcing members are secured to the upper legs or flanges of the Z-bars 57 and angles 56 by rivets 62 or other suitable means. If a joint in the reinforcing members 45 occurs adjacent the points of support, the peripheral joining or reinforcing plate 46 may be partially or completely held in place by the rivets 62. The plate 46 may be widened adjacent the point of attachment to the supporting members, as shown in Fig. 6, if desired.

In Figs. 10 and 11 is shown another modified form of my invention. In this modification, a tank 70 adapted for use in the semi-trailer type of tank truck is illustrated. The tank is so constructed that the forward end section 71 is of less depth than the rear end section 72, preferably by contracting the front end upwardly from the bottom with respect to the rear end portion, and keeping the top level throughout. This permits a truck tractor to be positioned with its rear wheels under the forward portion 71 of the tank.

Inner reinforcing members 15 are preferably secured to the top and sides of the interior of the tank 70 and curved to conform closely therewith, in the manner described in connection with Figs. 1 to 5, for example. A pair of these inner reinforcing members is secured in the enlarged rear end portion 72 of the tank, and another pair is secured in the smaller front end portion 71. Each end portion of the tank is also provided on its bottom with a pair of the outer reinforcing members 17 firmly secured to the outside of the tank 70 in alignment with the inner reinforcing members 15. Transverse frame members 9 substantially parallel and aligned with the reinforcing members 17 extend beneath the tank 70. The tank is supported by supporting members or struts 27 rigidly connected at one end to the transverse frame members 9 and at the other to an outer reinforcing member 17, by gusset plates 23 as previously described, or otherwise. The pair of transverse frame members 9 under the front end 71 and the pair under the rear end 72 of the tank 70 are each connected by a pair of longitudinal frame members 74 whose opposite ends are suitably secured to the transverse frame members 9. If convenient, the frame formed under the front end 71 by the transverse members 9 and the longitudinal members 74 may be utilized as part of the fifth wheel assembly.

Running gear or wheel, axle and spring assemblies of the type ordinarily used in automobile construction may be connected to the frame members under the rear end of the tank. For example, springs 76 may be connected to the transverse frame members 9 or the longitudinal frame members 74 by spring shackles 77, 78. The spring members 76 are also attached in the usual manner to an axle 80 on which the wheels 82 of the trailer are mounted. By this arrangement a substantially "chassisless" or frameless vehicle is provided which still furnishes adequate support for the tank.

In each of the embodiments of my invention above described it will be noted that the liquid conveying tank is supported upon vehicle frame members by supporting members which are so constructed and arranged that they provide substantially point supports for the tank, whereby the tank is carried out of contact with the frame members. The result is that the concentrated stresses which are set up in the tank by the movement of the truck or trailer along the road and the resulting shifting of the liquid in the tank are materially reduced. This is probably due partly to the fact that the tank and the truck chassis or frame members may each move independently to a certain extent, and partly to the fact that the members supporting the tank are preferably so secured to the tank that the deformation caused by the reaction of the tank to the supports under different load conditions is minimized.

While this invention has been described with reference to certain preferred embodiments thereof, it is obvious that certain changes may be made therein without departing from the spirit of the invention or the scope of the appended claims.

I claim:

1. In a vehicle tank structure, a vehicle frame adapted to carry a tank and having a transverse frame member, an elongated tank, an inner reinforcing member shaped to fit at least the top and sides of the interior of the tank and firmly secured thereto, an outer reinforcing member shaped to fit the outer surface of at least the lower portion of said tank and firmly secured thereto in alignment with said inner reinforcing member, said outer reinforcing member having its ends extending up the sides of the tank at least far enough to overlap the ends of the inner reinforcing member, and a supporting member connected to the overlapping portion of the outer reinforcing member on each side of the tank and connected to said transverse frame member, whereby the tank is supported out of contact with said frame.

2. In a vehicle tank structure, an elongated tank, an inner reinforcing member firmly secured to the inner surface of the tank at the top and sides thereof, an outer reinforcing member firmly secured to the outer surface of the tank at the bottom thereof and in alignment with said inner reinforcing member, the ends of said outer member overlapping the ends of said inner member, and means attached to said outer reinforcing member and adapted to support the tank.

3. In a vehicle tank structure, an elongated tank, inner reinforcing members shaped to fit the inner surface of the tank at the top and sides thereof and firmly secured thereto, outer reinforcing members shaped to fit the outer surface of the tank at the bottom thereof and firmly secured thereto, a vehicle frame having at least two transverse members parallel and aligned respectively with outer reinforcing members, and supporting members connecting said transverse members with the aligned reinforcing members at each side of the tank, each supporting member being connected from a transverse member to a reinforcing member in an upwardly and inwardly inclined position.

4. In a vehicle tank structure, an elongated elliptical tank provided with inlet and outlet openings, a pair of longitudinally spaced inner reinforcing members shaped to fit the top and sides of the interior of said tank and firmly secured thereto, leaving the bottom smooth to facilitate drainage, a pair of outer reinforcing members shaped to fit the bottom of the exterior of said tank and firmly secured thereto in alignment with the inner reinforcing members with their ends extending upwardly on both sides of the tank at least far enough to overlie the ends of the inner reinforcing members, each of said outer reinforcing members comprising a pair of channel-shaped elements disposed back-to-back and spaced sufficiently for the insertion of a gusset plate therebetween, a vehicle frame having longitudinal members extending beneath said tank and having a pair of transverse members extending across said longitudinal members parallel and aligned respectively with said outer reinforcing members, a pair of supporting members connecting each outer reinforcing member with the transverse frame member aligned therewith, each of the supporting members comprising a pair of channel-shaped members disposed back-to-back with space therebetween for insertion of a gusset plate, a gusset plate inserted in each supporting member and the adjacent portion of each outer reinforcing member and firmly secured thereto, and braces extending between the outer reinforcing members and the longitudinal frame members to prevent longitudinal movement of the tank with respect to the frame.

5. In a vehicle tank structure adapted for service as a semi-trailer, an elongated substantially elliptical tank having one end portion contracted upwardly from the bottom with respect to the other end portion, a pair of inner reinforcing members shaped to fit the top and sides of the interior of the larger end of the tank and secured in spaced relation therein and a similar pair of inner reinforcing members secured in spaced relation in the smaller end of the tank, a pair of outer reinforcing members shaped to fit the outside of the bottom of the large end of the tank and firmly secured thereto in alignment with the inner reinforcing members, a similar pair of outer reinforcing members shaped to fit the smaller end of the tank and secured thereto in alignment with the inner reinforcing members therein, a transverse frame member substantially parallel and aligned with each of the said outer reinforcing members and extending beneath the tank, a pair of supporting members rigidly connected to each transverse frame member and to the outer reinforcing member in alignment therewith and adapted to support the tank out of contact with the frame members, a pair of short longitudinal frame members connecting the transverse frame members under the larger end of the tank and providing a frame adapted for the attachment of running gear thereto, and a pair of short longitudinal frame members connecting the transverse frame members under the smaller end of the tank and providing a frame adapted for attachment to a truck tractor.

6. In a vehicle tank structure, an elongated tank, partial inner top and side and partial outer bottom circumferentially aligned reinforcing members, a pair of supporting members attached to said outer member, one on each side of the tank, and a frame member connected to said outer supporting member.

7. In a vehicle tank structure, an elongated tank, an inner top and side reinforcing member and an outer bottom reinforcing member, said latter member conforming to the shape of said tank and having its aligned ends overlap said inner member, a pair of supporting members attached to said outer reinforcing member one on each side of the tank, and a frame member connected to said supporting member.

8. In a vehicle tank structure, an elongated tank, an inner top and side reinforcing member and an outer bottom reinforcing member, said members conforming to the shape of said tank and having their aligned ends overlap, a pair of supporting members attached to said outer reinforcing member one on each side of the tank, and a frame member connected to said supporting member.

9. In a vehicle tank structure, an elongated tank, an inner top and side reinforcing member and an outer bottom reinforcing member, said latter member conforming to the shape of said tank and having its aligned ends overlap said inner member, a frame for carrying said tank including a transverse member below the tank and parallel with said reinforcing members and a supporting member connecting said outer reinforcing member with a frame on each side of the tank, the supporting members providing substantially point supports for said tank.

10. In a vehicle tank structure, an elongated tank, an inner top and side circumferential reinforcing member, an outer bottom circumferential reinforcing member, said members being in overlapping alignment, a frame for carrying said tank including a transverse member below the tank and parallel with said reinforcing members, and a supporting member connecting said outer reinforcing member with said frame on each side of the tank, the supporting members providing substantially point supports for said tank.

11. In a vehicle tank structure, an elongated tank, an inner top and side circumferential reinforcing member and an outer bottom circumferential reinforcing member, said members being in overlapping alignment for at least a portion of the circumference of said tank, a frame for carrying said tank including a transverse member below the tank and parallel with said reinforcing members, and a supporting member connecting said outer reinforcing member with said frame on each side of the tank, the supporting member providing substantially point supports for said tank.

12. In a vehicle tank structure, an elongated tank, an inner reinforcing member shaped to fit at least the top and sides of the interior of the tank and firmly secured thereto, an outer reinforcing member shaped to fit the outer surface of at least the lower portion of said tank and firmly secured thereto in overlapping alignment with said inner reinforcing member, a transverse frame member, a supporting member connected to the overlapping portion of the outer reinforcing member on each side of the tank and to said transverse frame member, whereby the tank is supported out of contact with said frame.

13. In a vehicle tank structure, an elongated elliptical tank, an inner top and side circumferential reinforcing member, an outer bottom circumferential reinforcing member, said members being in overlapping alignment, longitudinal vehicle frame members adapted to carry said tank, transverse frame members connecting the longitudinal frame members and extending outwardly therefrom, and supporting members secured to said bottom member and to said transverse members adjacent the end thereof.

14. In a vehicle tank structure, an elongated elliptical tank, an inner reinforcing member shaped to fit at least the top and sides of the interior of the tank and firmly secured thereto, an outer reinforcing member shaped to fit the outer surface of at least the lower portion of said tank and firmly secured thereto in alignment with said inner reinforcing member, said outer reinforcing member having its ends extending up the sides of the tank at least far enough to overlap the ends of the inner reinforcing member, and means connecting said outer member with the vehicle frame and providing substantially point supports for said tank whereby the tank is carried out of contact with the frame members.

15. In a vehicle tank structure, an elongated tank, overlapping internal and external circumferential reinforcing members secured to said tank and curved to conform therewith, a vehicle frame adapted to carry said tank, and supporting members extending upwardly from said frame to said external reinforcing member and providing substantially point supports for said tank, said external member and supporting members being structural shapes employed in pairs with slightly spaced parallel faces and being connected by gusset plates secured between said parallel faces.

16. In a vehicle tank structure, a tank reinforcing member comprising an inner reinforcing member firmly secured to the inner surface of the tank at the top and sides thereof, an outer reinforcing member firmly secured to the outer surface of the tank at the bottom thereof and in alignment with said inner reinforcing member, the ends of said outer member overlapping the ends of said inner member.

ALLAN R. FERGUSON.